(12) United States Patent
Brunt, Jr.

(10) Patent No.: US 10,620,348 B2
(45) Date of Patent: Apr. 14, 2020

(54) LOWER INDEX-GAP CORRECTIVE WEDGE PRISM

(71) Applicant: LumenFlow Corp., Wyoming, MI (US)

(72) Inventor: Harold W. Brunt, Jr., Grand Rapids, MI (US)

(73) Assignee: Lumenflow, Wyoming, MI (US)

( * ) Notice: Subject to any disclaimer, the term of this patent is extended or adjusted under 35 U.S.C. 154(b) by 72 days.

(21) Appl. No.: 15/802,586

(22) Filed: Nov. 3, 2017

(65) Prior Publication Data

US 2018/0164477 A1 Jun. 14, 2018

Related U.S. Application Data

(60) Provisional application No. 62/432,170, filed on Dec. 9, 2016.

(51) Int. Cl.
| | |
|---|---|
| *G02B 5/04* | (2006.01) |
| *G02B 27/12* | (2006.01) |
| *G02B 19/00* | (2006.01) |
| *G02B 27/30* | (2006.01) |

(52) U.S. Cl.
CPC ......... *G02B 5/045* (2013.01); *G02B 19/0028* (2013.01); *G02B 19/0061* (2013.01); *G02B 19/0066* (2013.01); *G02B 27/126* (2013.01); *G02B 5/04* (2013.01); *G02B 27/30* (2013.01)

(58) Field of Classification Search
CPC ............... G02B 5/045; G02B 19/0028; G02B 19/0066; G02B 19/0061; G02B 27/126; G02B 5/04; G02B 27/30
USPC ........................................................ 359/837
See application file for complete search history.

(56) References Cited

U.S. PATENT DOCUMENTS

| | | | | |
|---|---|---|---|---|
| 5,812,223 A | * | 9/1998 | Noguchi ............... | H04N 9/3105 348/E9.027 |
| 5,995,284 A | * | 11/1999 | Vanderwerf ......... | G02B 27/283 359/485.06 |
| 2012/0140184 A1 | * | 6/2012 | Bruzzone ............. | G02B 27/283 353/20 |

* cited by examiner

*Primary Examiner* — Jade R Chwasz
(74) *Attorney, Agent, or Firm* — Warner Norcross + Judd LLP

(57) ABSTRACT

An optical system providing improved control over light reflectivity is provided. The optical system includes an index-gap wedge prism to collect light escaping through the internal reflective surface of an optical element for recombination with light reflected by the internal reflective surface of the optical element. The index-gap wedge prism collects and redirects the escaped light back into the primary reflected path of the optical element to provide an aligned and correlated light across a range of applications, including applications where optical coatings on key surfaces may not be feasible.

20 Claims, 4 Drawing Sheets

LOWER INDEX-GAP CORRECTIVE WEDGE PRISM

CROSS-REFERENCE TO RELATED APPLICATIONS

This application claims the benefit of U.S. Provisional Application 62/432,170, filed Dec. 9, 2016, the disclosure of which is hereby incorporated by reference in its entirety.

BACKGROUND OF THE INVENTION

The present invention relates to optical systems having a corrective wedge prism to provide improved control over light reflectivity.

A number of optical elements use total internal reflection (TIR) for controlling the movement of light. Example optical elements having a TIR surface include prisms, Fresnel structures, and conic structures. In general, a relationship exists between the area of the TIR surface and the emission area of its nearby light source. As the area of TIR surface relative to the emission area of the light source decreases, the likelihood of losing energy through the TIR surface increases. Consequently, optical systems that use light sources having a large emission area can be prone to undesired efficiency losses. While optical coatings on key surfaces (reflectors or TIR surfaces) are suitable in some applications to limit efficiency losses, optical coatings may not be possible in all applications. For example, manufacturing costs and material incompatibilities can prevent the use of optical coatings in some applications.

It would therefore be beneficial to provide an improved optical system which reduces light losses through TIR surfaces while generating a more efficient light distribution across an illuminated area. In particular, it would be beneficial to provide a more efficient light distribution in conjunction with extended source light emitting elements, including for example one or more light emitting diodes (LEDs).

SUMMARY OF THE INVENTION

An optical system providing improved control over light reflectivity is provided. The optical system includes an index-gap wedge prism to collect light escaping through a TIR surface of an optical element for recombination with the primary reflected path of the optical element. The optical system can provide aligned and correlated light across a range of applications, including applications involving an extended source light emitting element and where optical coatings on key surfaces may not be feasible.

In one embodiment, the optical system includes a 45-degree right angle prism having a light receiving surface, a light emitting surface, and a TIR surface. A wedge prism is adjacent the right angle prism and includes a first refractive surface that is angled relative to the TIR surface of the right angle prism. The right angle prism and the wedge prism are fixed in relation to each other such that the wedge prism is adapted to collect light escaping through the TIR surface of the right angle prism for recombination with light propagating through the light emitting surface of the right angle prism.

In one embodiment, the optical system includes first and second wedge prisms to collect and redirect light escaping through the TIR surface of an optical element. The first and second wedge prisms each include a first refractive surface that is slightly angled relative to a second refractive surface. The second refractive surface of the first wedge prism and the first refractive surface of the second wedge prism are angled with respect to each other by less than five degrees such that an index gap exists therebetween.

In one embodiment, the index gap is achieved by a secondary surface with less than five degrees of tilt angle relative to an adjacent primary surface having a common mechanical joint. The index gap provides a stepped reduction in the index of refraction of any medium which is lower than the prismatic medium. This can include a vacuum, air and other gases, liquids, and polymers. The index gap assists in gathering escaped light by a change in angle of incidence, thereby causing the escaped light to meet a total internal reflectance condition within one or more wedge prisms. With the appropriate wedge angle, the escaped light can be rejoined into a primary reflected light path.

The embodiments of the present invention can therefore provide a low-cost, highly effective optical system including an index-gap wedge prism that is particularly well suited for extended source light emitting elements, including for example one or more light emitting diodes (LEDs). The optical system can be formed as a single molded component according to inexpensive manufacturing processes with minimal assembly time and cost. These and other advantages and features of the invention will be more fully understood and appreciated by reference to the drawings and the description of the current embodiments.

DESCRIPTION OF THE CURRENT EMBODIMENT

Figure 1:
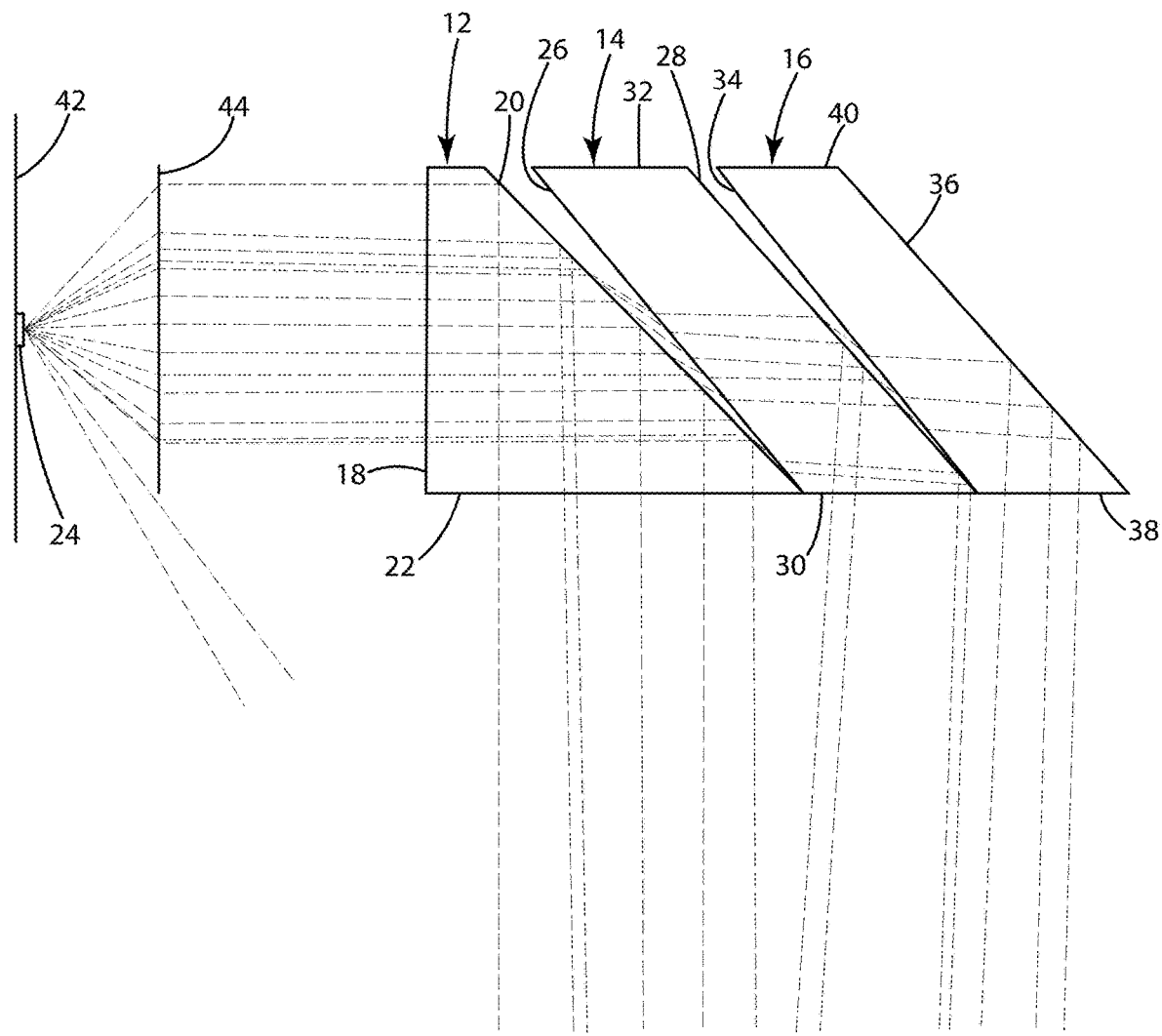
FIG. 1 is ray trace model of an optical system in accordance with a current embodiment.

An optical system in accordance with one embodiment is depicted in FIG. 1 and generally designated 10. The optical system 10 includes an optical element 12 having an internal reflective surface and one or more wedge prisms 14, 16. As discussed below, the wedge prisms 14, 16 can direct light escaping through the internal reflective surface back into the primary reflected path of the optical element 12 and provide aligned and correlated light across an illuminated area.

The optical element 12 generally includes a light receiving surface (or incident surface) 18, an internal reflective surface 20, and a light emitting surface (or exit surface) 22. The light receiving surface 18 is generally oriented to receive light from one or more light emitting elements 24 and defines a first surface area. The internal reflective surface 20 is angled relative to the light receiving surface 18 and defines a second surface area. The light emitting surface 22 is angled with respect to the internal reflective surface 20 and defines a third surface area. The optical element 12 is formed of a transparent material to allow light from the one or more light emitting elements 24 to propagate therethrough, generally reflecting downwardly from the internal reflective surface 20. In the illustrated embodiment the optical element 12 includes a forty-five degree right angle prism formed of a transparent material. In other embodiments the optical element 12 includes an internal reflective surface 20 that is angled relative to the primary propagation path of incident light at other than forty-five degrees, for example thirty five-degrees, thus deflecting light at seventy-degrees from the primary propagation path of incident light. As used herein, a "transparent material" means any material that is fully transparent, semitransparent, or translucent to light emitted by the one or more light emitting elements 24. The transparent material can include acrylic glass, a molded optical grade silicone, or other materials.

As noted above, the optical element 12 includes an internal reflective surface 20. While the internal reflective surface 20 is planar in the illustrated embodiment, it can be curved or form part of a conic in other embodiments. As used herein, an "internal reflective surface" includes a boundary surface of an optical element that is oriented at an angle relative to the primary propagation path of incident light (i.e., light striking the boundary surface). Where the primary propagation path of incident light is oriented at an angle with respect to the normal of the internal reflective surface 20 that is greater than a critical angle, the internal reflective surface 20 provides total internal reflection as a "TIR surface." The critical angle, as provided by Snell's law, is a function of the index of refraction of each medium at this interface. For a primary medium of glass and a secondary medium of air, for example, the critical angle is about forty-two degrees. In the illustrated embodiment the optical element 12 is a forty-five degree right angle prism, such that the internal reflective surface 20 is inclined forty-five degrees relative to incident light. Because this angle is greater than forty-two degrees, the internal reflective surface 20 is a TIR surface. The internal reflective surface 20 need not be a TIR in all embodiments, however, and can in some embodiments be angled such that incident light is oriented at an angle with respect to the normal of the internal reflective surface 20 that is less than a critical angle.

The wedge prisms 14, 16 are adjacent the optical element 12 to direct light escaping through the TIR surface 20 back into the primary reflected path of the optical element 12. The first wedge prism 14 includes a first refractive surface 26, a second refractive surface 28, a lower intermediate surface 30, and an upper intermediate surface 32. The second wedge prism 16 includes a first refractive surface 34, a second refractive surface 36, a lower intermediate surface 38, and an upper intermediate surface 40. The wedge prisms 14, 16 are also formed of a transparent material to allow light from the one or more light emitting elements 24 to propagate therethrough, for example acrylic glass or molded optical grade silicone, further optionally the same material forming the optical device 12. The wedge prisms 14, 16 need not be the same material, however, and need not have the same index of refraction as the optical element 12. The wedge prisms 14, 16 include a small apex angle, generally 5 degrees or less, further optionally 3 degrees or less, the apex angle being defined as the angle between the first refractive surface and the second refractive surface. The use of more than two wedge prisms 14, 16 is also possible. For example the optical system 10 may include third and fourth wedge prisms to ensure a higher degree of intensity cut-off, i.e., stronger dark to light edge or boundary condition As shown in FIG. 1, the first refractive surface 26 of the first wedge prism 14 is inclined relative to the TIR surface 20 of the optical element 12, optionally by 5 degrees or less, referred to herein as the first wedge angle. Similarly, the first refractive surface 34 of the second wedge prism 16 is inclined relative to the second refractive surface 38 of the first wedge prism 16, optionally by 5 degrees or less, referred to herein as the second wedge angle. The wedge prisms 14, 16 are mechanically joined at the junction of the first refractive surface 34 of the second wedge prism 16 and the second refractive surface 28 of the first wedge prism 14. In addition, the first wedge prism 14 is mechanically joined to the optical element 12 at the junction of the first refractive surface 26 of the first wedge prism 14 and the TIR surface 20 of the optical element 12.

A first index gap is achieved between the optical element 12 and the first wedge prism 14 and a second index gap is achieved between the first wedge prism 14 and the second wedge prism 16. More specifically, the index gaps are achieved with a secondary surface with less than five degrees of inclination relative to an adjacent primary surface, optionally having a common mechanical joint. The index gaps provide a stepped reduction in the index of refraction of any medium which is lower than the prismatic medium. This can include a vacuum, air and other gases, liquids, and polymers. The index gaps assist in gathering escaped light by a change in angle of incidence, thereby causing the escaped light to meet a total internal reflectance condition within one or more wedge prisms 14, 16. With the appropriate wedge angle, the escaped light can be rejoined into a primary reflected light path.

The optical system 10 is illustrated in combination with one or more light emitting elements 24 to form an optical emitter. The one or more light emitting elements 24 are light emitting diodes in the present embodiment, but can be laser diodes or other light emitting elements in other embodiments. The light emitting elements 24 are directly or indirectly mounted to a substrate 42, for example a printed circuit board. Though one light emitting element 42 is shown, greater light emitting elements can be used in other embodiments where desired. For example, the one or more light emitting elements can also include an extended source light emitting element(s). As used herein, "extended source light emitting element" means any light emitting element(s) that effectively provides an emission area greater than fifty percent of the surface area of the light receiving surface 18 of the optical element 12.

Figure 2:
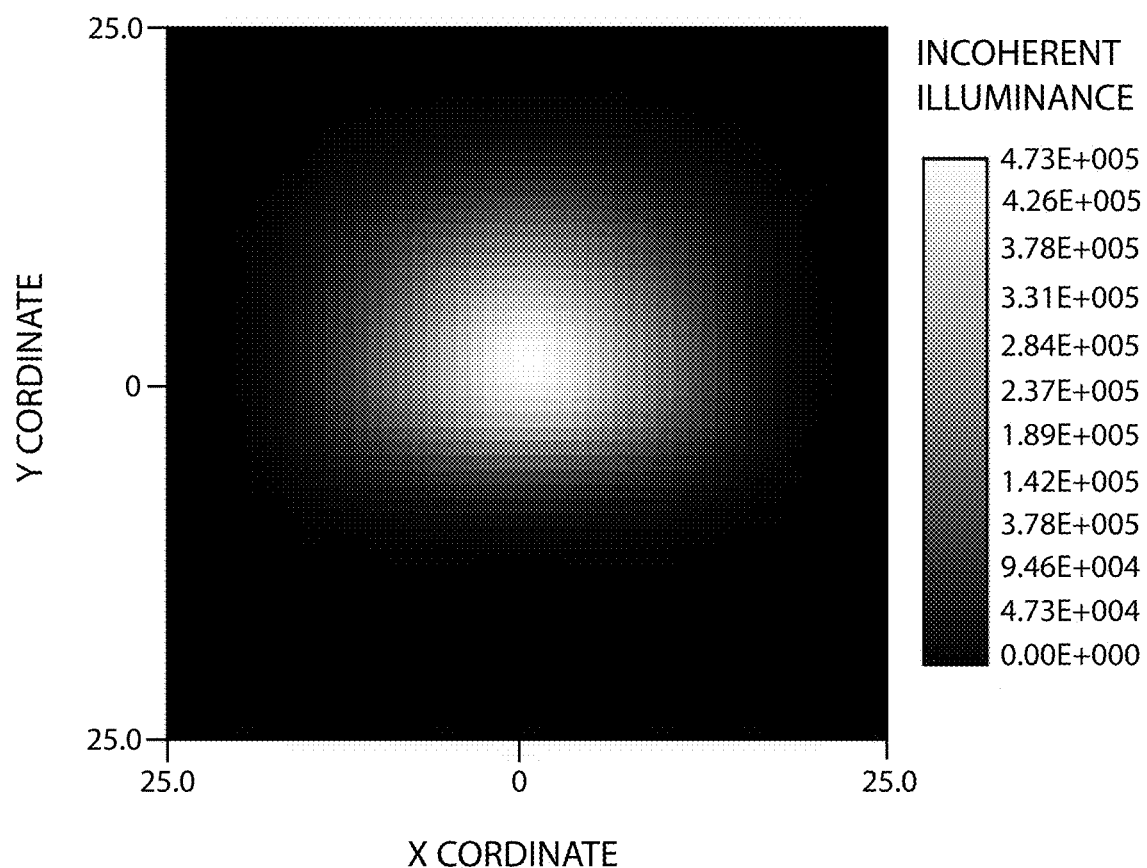
FIG. 2 is a model of the incoherent illuminance obtained for the optical system of FIG. 1.
Figure 3:
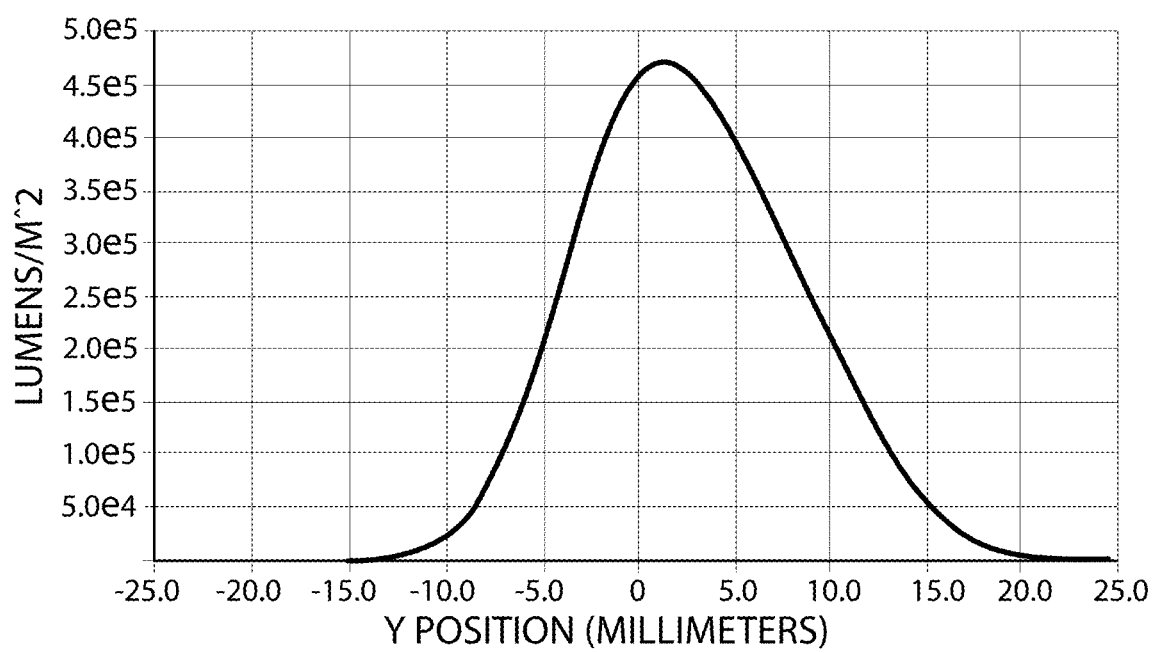
FIG. 3 is vertical intensity profile obtained for the optical system of FIG. 1.
Figure 4:
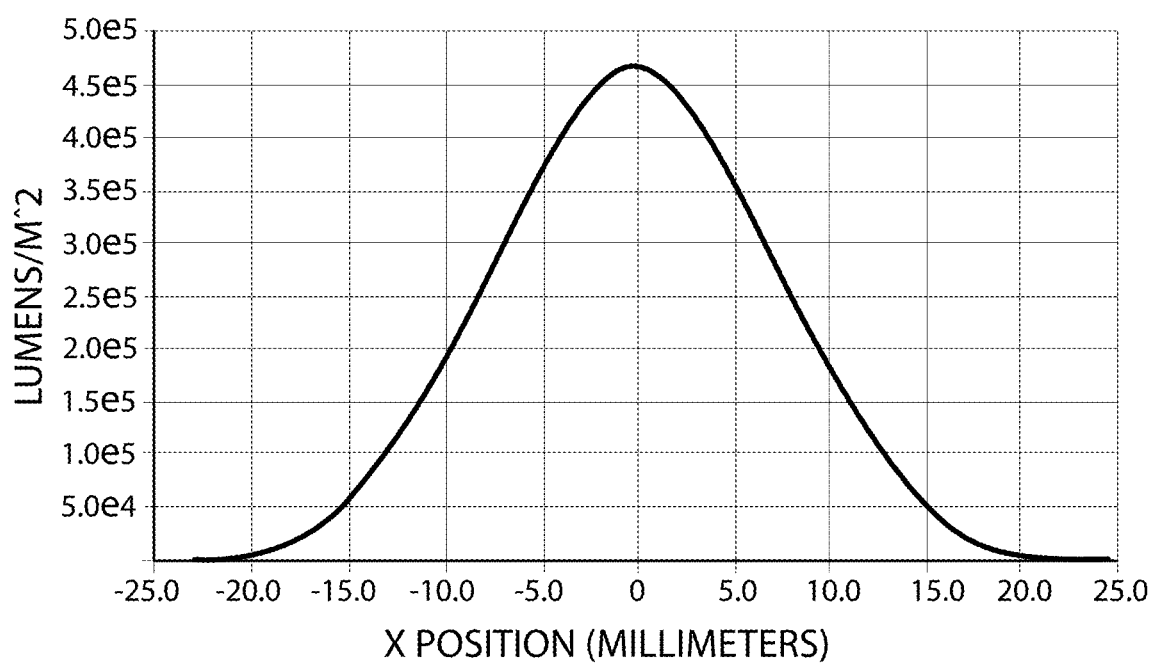
FIG. 4 is horizontal intensity profile obtained for the optical system of FIG. 1.

FIGS. 2 through 4 further illustrate the performance of the optical system of the present invention. FIG. 2 includes a model of the incoherent illuminance obtained for the optical system of FIG. 1, demonstrating excellent coherence across the illuminated area. FIG. 3 is vertical intensity profile obtained for the optical system of FIG. 1, and FIG. 4 is horizontal intensity profile obtained for the optical system of FIG. 1.

In operation, light from the light emitting elements 24 enters the optical element 12 (shown as a forty-five degree right angle prism) along a primary propagation path, optionally through a collimating lens 44. Most light will reflect off of the primary TIR surface 20 downward at ninety-degrees from the initial propagation axis. At the lower edge of the TIR surface 20, however, the angle of incidence is less than the critical angle, and therefore escapes the optical element 12. The escaped light passes a first index gap and enters the first wedge prism 14, where the second refractive surface 28 is optionally a further TIR surface. If as shown in FIG. 1 light escapes the second refractive surface 28 of the first wedge prism 14, the light passes a second index gap and enters the second wedge prism 16. There, the second refractive surface 36 of the second wedge prism is a third TIR surface and directs light downwardly ninety-degrees from the initial propagation axis. Collectively, the first and second wedge prisms 14, 16 cause the escaped light to be rejoined with light reflected by the first TIR surface 20 into a primary reflected light path. Accordingly, the first and second wedge prisms 14, 16 provide a set of optical paths for light not propagating in the TIR path, effectively rejoining the escaped light with the primary reflected light.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. An optical system for use with a light emitting element comprising:
    an optical element including a light receiving surface and including a total internal reflection (TIR) surface; and
    a first wedge prism adjacent the optical element and including a refractive surface that is inclined at a non-zero angle relative to the light receiving surface and the TIR surface of the optical element;
    wherein the optical element and the first wedge prism are fixed in relation to each other and define an index-gap between the TIR surface of the optical element and the refractive surface of the first wedge prism, such that the first wedge prism is adapted to internally redirect light passing through the TIR surface of the optical element for recombination with light reflected by the TIR surface of the optical element.

2. The optical system of claim 1 wherein the refractive surface of the wedge prism is angled relative to the TIR surface of the optical element by an acute angle of less than five degrees.

3. The optical system of claim 1 further including a second wedge prism, the second wedge prism being fixed in relation relative to the first wedge prism.

4. The optical system of claim 3 wherein the second wedge prism includes a refractive surface that is angled relative to the refractive surface of the first wedge prism.

5. The optical system of claim 3 wherein the optical element and the first and second wedge prisms are formed according to a single piece molding process.

6. The optical system of claim 1 wherein the optical element is a right angle prism.

7. The optical system of claim 1 wherein the optical element includes a Fresnel structure.

8. The optical system of claim 1 wherein the optical element includes a conic structure.

9. An optical emitter comprising:
    a light emitting element to provide a light output along a propagation axis;
    an optical element positioned to receive the light output from the light emitting element, the optical element including a light receiving surface, a total internal reflection (TIR) surface, and a light emitting surface; and
    a wedge prism including a first refractive surface, a second refractive surface angled relative to the first refractive surface, and a lower intermediate surface therebetween, the first refractive surface being inclined relative to the light receiving surface and the TIR surface of the optical element;
    wherein the optical element and the wedge prism are fixed in relation to each other and define an index-gap between the TIR surface of the optical element and first the refractive surface of the wedge prism, such that at least a portion of the light output from the light emitting element propagates through the TIR surface of the optical element and is internally redirected by the wedge prism through the lower intermediate surface of the wedge prism.

10. The optical emitter of claim 9 wherein the optical element is a right angle prism adapted to angle light downward at ninety-degrees from the light output propagation axis.

11. The optical emitter of claim 9 wherein the first refractive surface of the wedge prism is angled relative to the TIR surface of the optical element by an acute angle of less than five degrees.

12. The optical emitter of claim 11 wherein the optical element includes a Fresnel structure.

13. The optical emitter of claim 11 wherein the optical element includes a conic structure.

14. The optical emitter of claim 9 wherein the light receiving surface of the optical element is substantially perpendicular to the light output propagation axis.

15. The optical emitter of claim 9 wherein the light emitting surface of the optical element is coplanar with the lower intermediate surface of the wedge prism.

16. The optical emitter of claim 9 wherein the wedge prism is a first wedge prism and further including a second wedge prism, the second wedge prism being fixed in relation relative to the first wedge prism such that at least a portion of light propagating through the second refractive surface of the first wedge prism is corrected downwardly by the second wedge prism.

17. The optical emitter of claim 16 wherein the second wedge prism includes a first refractive surface, a second refractive surface angled relative to the first refractive surface, and a lower intermediate surface therebetween, the first refractive surface of the second wedge prism being angled relative to the second refractive surface of the first wedge prism by an acute angle of less than five degrees.

18. The optical emitter of claim 17 wherein the optical element and the first and second wedge prisms are formed according to a single piece molding process.

19. The optical emitter of claim 9 wherein the light emitting element includes a light emitting diode.

20. The optical emitter of claim 9 wherein the light emitting element includes an array of light emitting diodes.

* * * * *